(12) United States Patent
Kimmel et al.

(10) Patent No.: US 9,632,731 B2
(45) Date of Patent: *Apr. 25, 2017

(54) DISTRIBUTING CAPACITY SLICES ACROSS STORAGE SYSTEM NODES

(71) Applicant: NetApp, Inc., Sunnyvale, CA (US)

(72) Inventors: Jeffrey S. Kimmel, Chapel Hill, NC (US); Tim Emami, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/695,608

(22) Filed: Apr. 24, 2015

(65) Prior Publication Data

US 2015/0355863 A1     Dec. 10, 2015

Related U.S. Application Data

(63) Continuation of application No. 13/734,274, filed on Jan. 4, 2013, now Pat. No. 9,043,545.

(60) Provisional application No. 61/584,159, filed on Jan. 6, 2012.

(51) Int. Cl.
*G06F 12/00* (2006.01)
*G06F 3/06* (2006.01)
*G06F 11/10* (2006.01)
*G06F 11/20* (2006.01)

(52) U.S. Cl.
CPC .......... *G06F 3/0689* (2013.01); *G06F 3/0605* (2013.01); *G06F 3/0619* (2013.01); *G06F 3/0644* (2013.01); *G06F 3/0665* (2013.01); *G06F 11/1088* (2013.01); *G06F 11/2094* (2013.01)

(58) Field of Classification Search
CPC .. G06F 11/2094; G06F 3/0605; G06F 3/0644; G06F 3/0665; G06F 11/1088
USPC ........................................................ 711/114
See application file for complete search history.

(56) References Cited

U.S. PATENT DOCUMENTS

| | | | | |
|---|---|---|---|---|
| 2003/0041211 A1* | 2/2003 | Merkey | ............... | G06F 11/1076 711/114 |
| 2003/0070043 A1* | 4/2003 | Merkey | ............... | G06F 11/1076 711/114 |
| 2009/0240880 A1* | 9/2009 | Kawaguchi | ........... | G06F 3/0617 711/114 |

* cited by examiner

*Primary Examiner* — Matthew Bradley
(74) *Attorney, Agent, or Firm* — Nixon Peabody, LLP; Khaled Shami

(57) ABSTRACT

Various systems and methods are described for configuring a data storage system. In one embodiment, a plurality of actual capacities of a plurality of storage devices of the data storage system are identified and divided into a plurality of capacity slices. The plurality of capacity slices are combined into a plurality of chunks of capacity slices, each having a combination of characteristics of the underlying physical storage devices. The chunks of capacity slices are then mapped to a plurality of logical storage devices. A group of the plurality of logical storage devices is then organized into a redundant array of logical storage devices.

20 Claims, 11 Drawing Sheets

DISTRIBUTING CAPACITY SLICES ACROSS STORAGE SYSTEM NODES

RELATED APPLICATIONS

This application is a Continuation of U.S. patent application Ser. No. 13/734,274, entitled "DISTRIBUTING CAPACITY SLICES ACROSS STORAGE SYSTEM NODES", filed on Jan. 4, 2013, which further claims benefit of priority to U.S. Provisional Application Ser. No. 61/584,159, entitled "DISTRIBUTING CAPACITY SLICES ACROSS STORAGE SYSTEM NODES," filed on Jan. 6, 2012, the aforementioned applications being hereby incorporated by reference in their entirety for all purposes.

FIELD

The present disclosure relates generally to configuring a data storage system, and, more specifically, to distributing slices of storage characteristics of storage devices across multiple nodes of the data storage system.

BACKGROUND

A data storage system may include multiple nodes, each of which is associated with one or more mass storage devices, such as an array of hard disk drives (HDDs) or solid state drives (SSDs). Although each storage device within a mass storage device may have a same nominal (or advertised) capacity, such as 1 terabyte (TB), each storage device within the mass storage device may, in fact, have an actual capacity (e.g., a raw or usable capacity) that is greater than or less than its nominal capacity. There may be a difference between the nominal capacity of the storage device and the actual capacity of the storage device for various reasons. For example, a vendor of the storage device may use a base-10 decimal unit of measure, interpreting 1 TB as 1000 gigabytes, whereas an operating system of the data storage system may use a base-2 or binary system to interpret 1 TB as being 1024 gigabytes (GB). This difference between nominal and actual capacities of the storage devices may lead to losses of efficiency in the data storage system when, for example, the storage devices are arranged into a redundant array, such as a redundant array of inexpensive disks (RAID), based on the nominal capacities of the storage devices. For example, if a storage device is selected for inclusion in a RAID configuration based on its nominal capacity, but turns out to have an actual capacity that is less than a required minimum capacity for the RAID configuration, the data storage system may exclude the entire capacity of the storage device from the RAID configuration. Thus, based at least partly on a difference between the nominal capacity and actual capacity of a storage device, a storage device may end up as a yield loss.

SUMMARY

Embodiments of the present invention provide various techniques for configuring a data storage system. Address spaces corresponding to the actual storage capacities of the storage devices are placed into a pool of address spaces. The pool may be accessible to multiple nodes of the storage system. The pool is divided into slices of address spaces (or capacity slices). The sizes of the capacity slices may be determined based on various factors, such as a determination of capacity, performance, or fault tolerance requirements of a node of the storage system with which chunks of capacity slices may be associated.

The capacity slices are combined into chunks of capacity slices. The composition of each chunk of capacity slices (e.g., which address spaces of which physical storage devices are included in the chunk) may also be determined based on various factors, such as the requirements of the node to which the chunk may be assigned. In other words, each chunk may be composed of capacity slices having different storage characteristics of the underlying physical storage devices, and thus blend together storage characteristics that, for example, are optimized to meet the requirements of an application running on the node.

The chunks of capacity slices are mapped to logical storage devices. One or more groups of the logical storage devices are then organized into one or more redundant arrays of storage devices (e.g., a redundant array of inexpensive disks (RAID)), each of which may have a different level of redundancy.

One or more groups of logical storage devices may be assigned to a node of the storage system (e.g., based on storage requirements of the node). Relative storage characteristics of the nodes of the storage system may be monitored, and chunks of capacity slices may be redistributed across groups of logical storage devices at run-time based on the monitoring to, for example, maintain a balance of the storage characteristics among the nodes of the storage system.

Thus, various characteristics of the storage devices within mass storage devices associated with nodes of the data storage system may be changed dynamically to meet requirements, including capacity, performance, and fault tolerance requirements, of the nodes (e.g., including applications executing on the nodes) among which the storage devices (or portions of the storage devices) may be shared.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Figure 1:
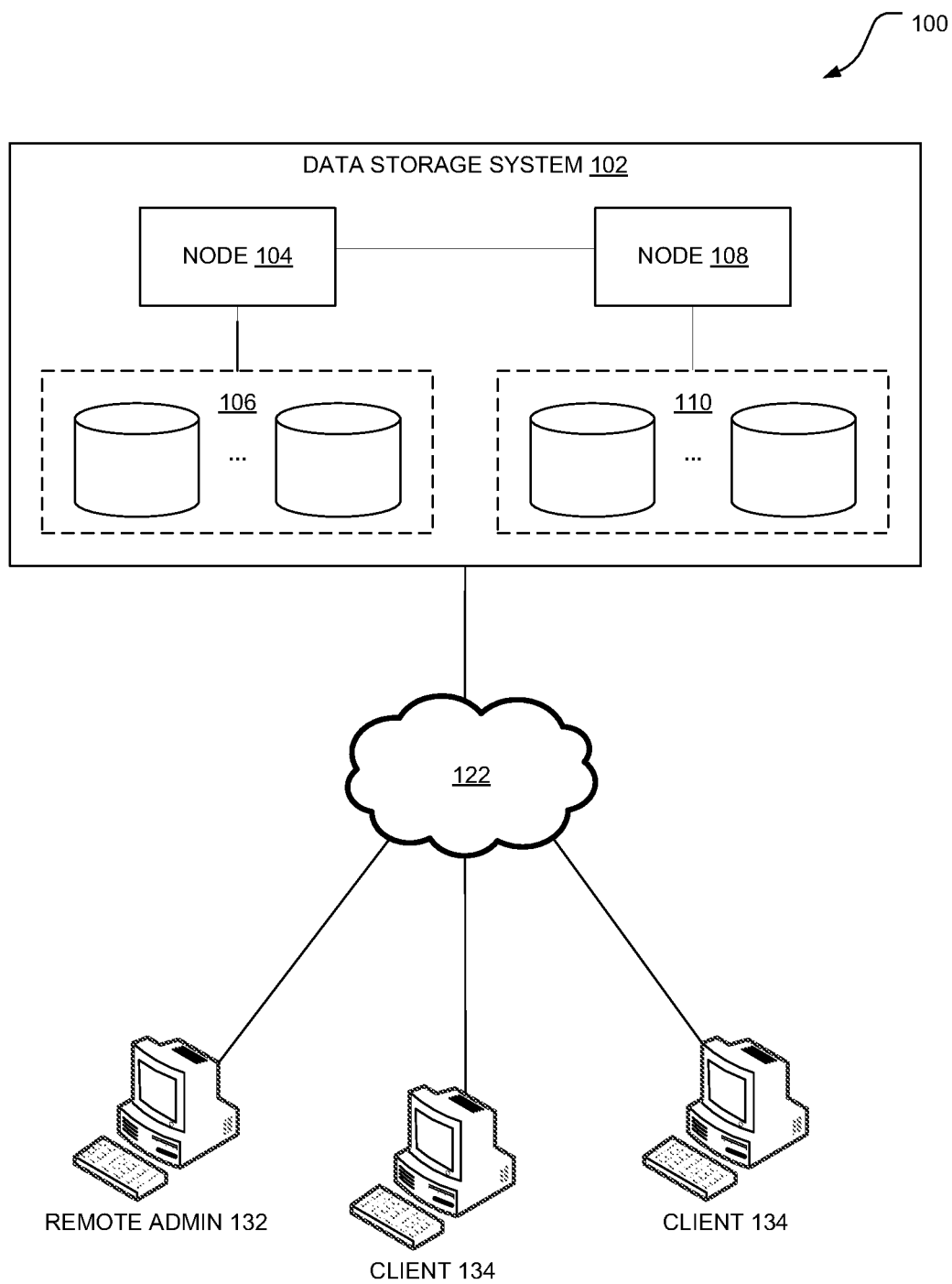
FIG. 1 depicts a block diagram of a system of processing systems, consistent with one embodiment of the present invention.

FIG. 1 depicts a block diagram of a system 100 of processing systems, consistent with one embodiment of the present invention. As depicted, the system 100 includes a data storage system 102 and various processing systems (e.g., clients 134 and remote administrative console 132) in communication with the data storage system 102 through network 122. For example, the network 122 may be a local area network (LAN) or wide area network (WAN). The data storage system 102 operates on behalf of the clients 134 to store and manage storage objects (e.g., blocks or files) in mass storage memories 106 and 110 (e.g., an array of hard disks). As used herein, a "file" is a collection of data constituting a storage object that has a name, called a filename. Examples of files include data files, text files, program files, directory files, and so on. Each of the clients 134 may be, for example, a conventional personal computer (PC), a workstation, a smart phone, or another processing system.

In this example, the data storage system 102 includes nodes 104 and 108 in communication with each other. As used herein, a "node" is a point in a computer network where a message can be created, received, or transmitted. A node may include one or more processors, storage controllers, memory, and network interfaces. A node may also be a "blade server," which, as used herein, is a special-purpose computer having a modular design optimized to minimize the use of physical space and energy. An example of a node is the node 104 of FIG. 2. The nodes 104 and 108 also communicate with and manage the mass storage devices 106 and 110, respectively, and receive and respond to various read and write requests from the clients 134, directed to data stored in, or to be stored in, the data storage system 102. The mass storage devices 106 may be or include any machine-readable medium for storing large volumes of data in a non-volatile manner, such as one or more magnetic or optical based disks, or for storing one or more sets of data structures and instructions (e.g., software) embodying or utilized by any one or more of the methodologies or functions described herein. The mass storage devices 106 and 110 may be, for example, conventional magnetic disks, optical disks such as CD-ROM or DVD based storage, magneto-optical (MO) storage, NAND flash memory, or any other type of non-volatile storage devices suitable for storing large quantities of data. The mass storage devices may be organized into one or more volumes of Redundant Array of Inexpensive Disks (RAID).

The data storage system 102 may be, for example, a file server, and more particularly, a network attached storage (NAS) appliance. Alternatively, the data storage system 102 may be a server that provides clients with access to information organized as data containers, such as individual data blocks, as may be the case in a storage area network (SAN). In yet another example, the data storage system 102 may be a device that provides clients with access to data at both the file level and the block level.

Also depicted in FIG. 1 is the remote administrative console 132 in communication with the data storage system 102. This configuration enables a network administrator or other users to perform management functions on the data storage system 102.

Figure 2:
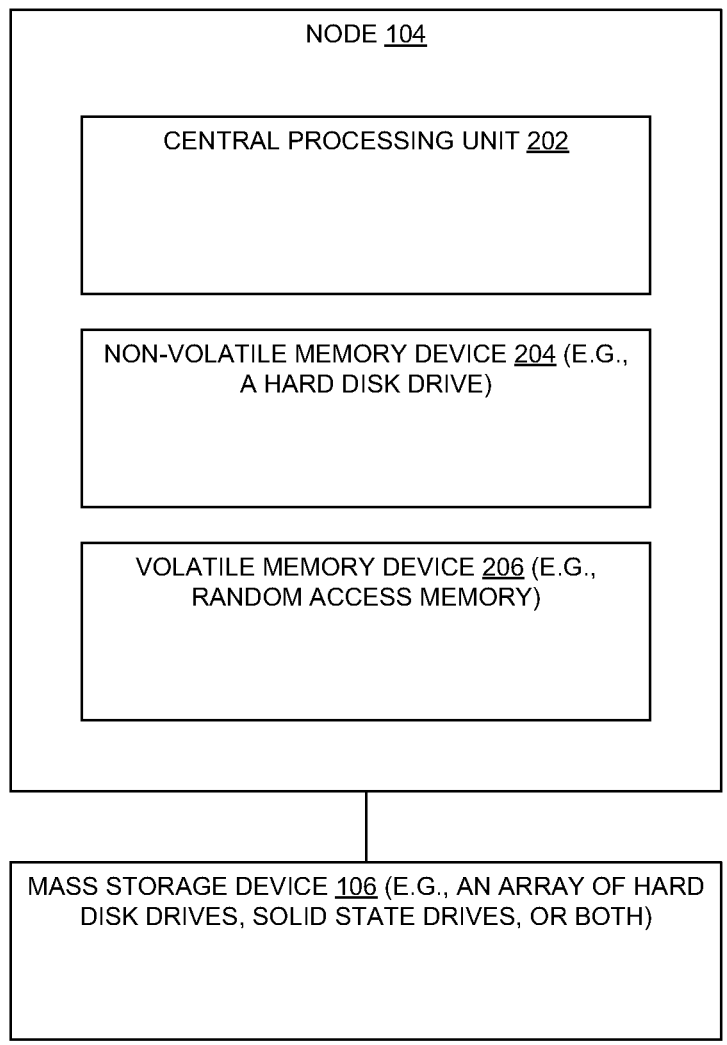
FIG. 2 depicts a block diagram of hardware associated with a node of the data storage system of FIG. 1.

FIG. 2 depicts a block diagram of hardware associated with the node 104 of the data storage system 102 of FIG. 1. The hardware includes one or more central processing units (CPUs) 202, one or more non-volatile memory devices 204 (e.g., a hard disk), and one or more volatile memory devices 206 (e.g., an SRAM). The CPUs 202 may be, for example, one or more programmable general-purpose or special-purpose microprocessors or digital signal processors (DSPs), microcontrollers, application specific integrated circuits (ASICs), programmable logic devices (PLDs), or a combination of such devices. The memories 204 and 206 store, among other things, the operating system of the node 104.

As used herein, a "non-volatile memory" is a computer memory that retains its contents when it loses power. Examples of non-volatile memory may include read-only memory, flash memory, magnetic storage devices (e.g., a hard disk), and optical disks. As used herein, a "volatile memory" is a computer memory that loses its contents when it loses power. Examples of volatile memory may include random-access memory, static random-access memory (SRAM), and dynamic random-access memory (DRAM).

It should be appreciated that in other embodiments, the node 104 may be associated with different hardware from that shown in FIG. 2. For example, in an alternate embodiment, the node 104 may not be associated with mass storage device 106.

Figure 3:
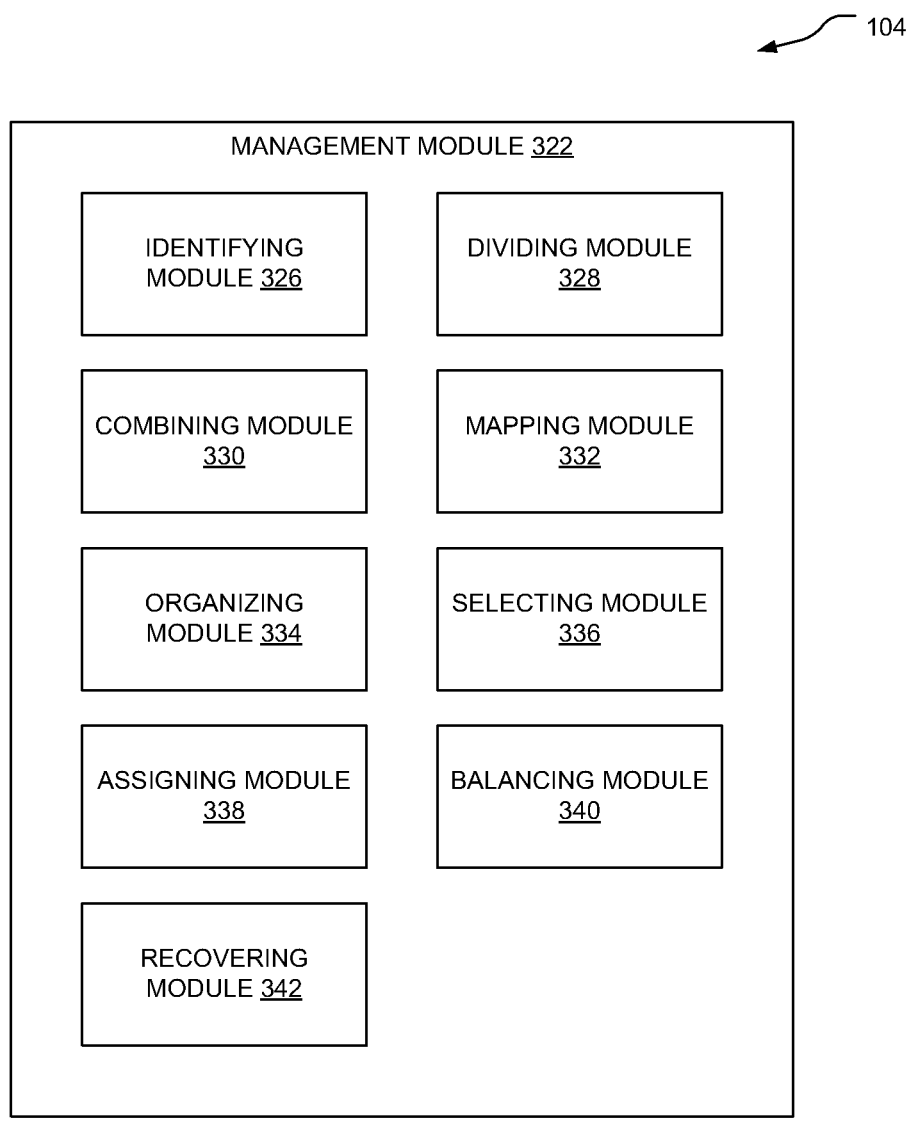
FIG. 3 depicts an block diagram of example software modules that the node of FIG. 2 is configured to execute.

FIG. 3 depicts a block diagram of example software modules that the node 104 is configured to execute, in accordance with various embodiments of the present invention. As depicted, the software modules include a management module 322 that is configured to manage storage of data in the data storage system 102.

The management module 322 includes an identifying module 326 that is configured to identify characteristics of storage devices, such as the storage devices included in the mass storage device 106. For example, the identifying module 326 may be configured to identify the actual capacity, performance level (e.g., input/output operations per second (IOPS), or fault tolerance (e.g., a manufacturer's over-provisioning allowance or capacity protection holdback, as described below) of a storage device.

The management module 322 includes a dividing module 328 that is configured to pool the address spaces corresponding to the actual capacities of multiple storage devices, such as the storage devices included in the mass storage device 106, and divide the pool of address spaces into multiple slices of address spaces (or capacity slices), as described below.

The management module 322 includes a combining module 330 that is configured to combine capacity slices into a plurality of chunks of capacity slices. The combining module 330 may determine a composition of a chunk of capacity slices, and select the capacity slices for the chunk, based on the storage characteristics (e.g., capacity, performance, or fault tolerance) of the underlying physical devices from which each of the slices is derived or various storage requirements of a node of the storage system with which the chunk may be associated. Thus, a chunk of capacity slices may be a collection or group of capacity slices that may be mapped to a logical device, which is, in turn, assigned to a node, as described below.

The management module 322 includes a mapping module 332 that maps the chunks of capacity slices to multiple logical storage devices. For example, the mapping module 332 may map the capacity slices to four or more logical storage devices. As used herein, a logical storage device is a virtual storage device; in other words, a logical storage device is a storage device that does not exist as a single physical entity. For example, the mapping module 332 may map the capacity slices of 16 underlying physical storage devices to four logical storage devices. From the perspective of the data storage system 102, these four logical storage devices may appear to be physical storage devices.

The management module 322 includes an organizing module 334 that is configured to organize groups of logical storage devices. For example, the organizing module 334 may organize a group of logical storages into a redundant array of logical storage devices (e.g., a RAID configuration). The organizing module 334 may also organize an additional group of logical storage devices into an additional redundant array or organize a group of logical storage devices into spare logical devices (e.g., to support a RAID configuration).

The management module 322 includes a selecting module 336 that is configured to select sizes of chunks of capacity slices. The selection may be based on requirements of a node to which the chunk may be assigned. For example, if a node to which the chunk will be assigned cannot use more than 10 TB of capacity, the selection module 336 may select the size of the chunk that is to be assigned to the node to 10 TB.

The management module 322 includes an assigning module 338 that is configured to assign groups of a plurality of logical storage devices to one or more sub-systems (e.g., nodes) of a data storage system. For example, the assigning module 338 may assign four or more logical storage devices to the node 104 such that the node 104 may support a RAID 6 configuration and three or more logical storage devices to the node 106 such that the node 106 may support a RAID 5 configuration.

The management module 322 includes a balancing module 340 that is configured to balance storage characteristics among multiple nodes of a storage system. For example, the balancing module 322 may determine whether storage characteristics are unbalanced between multiple nodes of the storage system. In other words, the balancing module 340 may detect that a storage capacity, performance, or fault tolerance of a node is unbalanced with respect to an additional node. Based on this determination, the balancing module 340 may move one or more portions (e.g., one or more address spaces) of a capacity slice between nodes to move toward restoring a balance between the nodes.

The management module 322 includes a recovering module 342 that is configured to recover data stored on one or more failed data storage devices of the data storage system. Because one or more capacity slices of a failed data storage device may be distributed across multiple logical data storage devices, the failure of a data storage device may be treated as a partial failure of the multiple logical data storage devices. Thus, several nodes may participate in the recovery of the failed data storage device, which may speed up the recovery process in comparison to a recovery of an entire data storage device performed by a single node.

Figure 4:
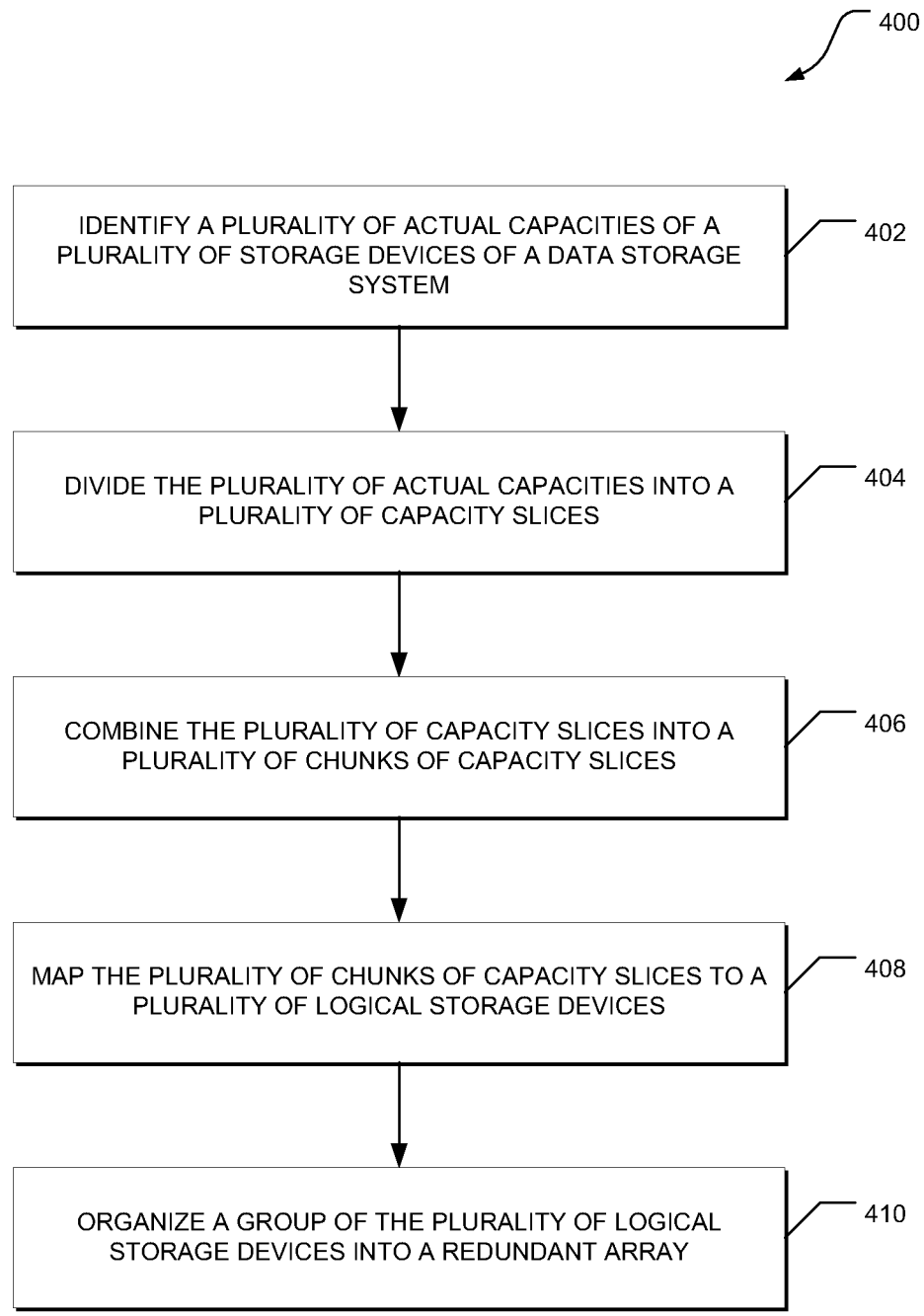
FIG. 4 depicts a flow diagram of a general overview of a method of configuring a data storage system.

FIG. 4 depicts a flow diagram of a general overview of a method 400, in accordance with an embodiment, of configuring a data storage system. The method 400 may be implemented by the management module 322 of FIG. 3. At operation 402, the identifying module 326 identifies a plurality of actual capacities of a plurality of storage devices of the data storage system 102. Each of the plurality of actual capacities may be an actual physical (or raw) capacity of a corresponding storage device. For example, the identifying module 326 may identify a plurality of actual capacities of each of the storage devices included in the mass storage device 106.

Each of the actual capacities may not include a portion of the capacity that is reserved, for example, as a manufacturer holdback. A manufacturer holdback is a portion of the actual capacity of the storage device that the manufacturer reserves from access by a user of the storage device in order to, for example, improve performance or fault tolerance characteristics of the storage device. For example, a manufacturer may declare an over-provisioning allowance of 28% on a 128 GB solid-state drive, meaning that the storage device effectively has an actual capacity of 120 GB. In this case, 8 GB of the solid-state drive is hidden from users of the solid-state drive. This over-provisioning allowance may enable the storage device to reduce the well-known phenomenon of write amplification. Or the manufacturer may not publish a spare capacity of a hard disk drive, effectively enabling the hard disk drive to use spare capacity that is hidden from the user to manage defects. In some embodiments, these various forms of manufacturer holdbacks may not be included in the actual capacities of the plurality of storage devices identified by the identifying module 402. In various other embodiments, however, these manufacturer holdbacks may be included in the actual capacities of the plurality of storage devices identified by the identifying module 402. Whether manufacturer holdbacks are included in the identification of the actual capacities of the plurality of storage devices may be configurable by, for example, an administrator of the data storage system 102.

The identifying module 326 may identify various other characteristics of each of the plurality of storage devices. For example, the identifying module 302 may identify one or more performance characteristics of a storage device, such as the total IOPS, random read IOPS, random write IOPS, sequential read IOPS, sequential write IOPS, and so on. The identifying module 302 may identify the performance characteristics of a storage device in various ways, such as based on numbers published by the manufacturer of the storage device, a measurement of the IOPS of the performance device (e.g., with an application such as Iometer, IOzone, or FIO), or an estimate of the performance of the device based on various characteristics of the storage device, such as its type (e.g., solid-state drive or hard disk drive), its speed (e.g., for a hard disk, the revolutions per minute of the hard disk platter), its interface (e.g., Serial Advanced Technology Attachment (SATA) 3, SATA 6, Serial Attached SCSI (SAS), Peripheral Component Interconnect Express (PCIe), Infini-Band, or internet small computer system interface (iSCSI)), or information about its firmware.

At operation 404, the dividing module 328 divides the plurality of actual capacities into a plurality of capacity slices. A capacity slice is a portion of an address space of a storage device. For example, the dividing module 328 may pool the address spaces of the storage devices and then divide the address spaces in the pool into a number of capacity slices. Each of the number of capacity slices may have a same fixed size (e.g., in bytes). In this case, the number of capacity slices multiplied by the fixed size of the capacity slices equals the total address space derived from the plurality of devices that may be accessed by the data storage system.

At operation 406, the combining module 330 combines chunks of the plurality of capacity slices. The combining module 330 may determine a composition of a chunk of capacity slices, and select the capacity slices for the chunk, based on storage characteristics (e.g., capacity, performance, or fault tolerance) of the underlying physical devices from which each of the slices is derived or various storage requirements of a node of the storage system to which the chunk may be assigned. For example, a first chunk that is to be assigned to a first node may be composed of capacity slices from a storage device (e.g., a solid state drive) having better performance than an additional storage device (e.g., a hard disk drive) based on a determination that the first node is likely to require more input/output operations per second (IOPS) than a second node of the data storage system to which a second chunk is to be assigned. Or the first chunk may be composed of capacity slices from a storage device having more fault tolerance (e.g., a bigger manufacture holdback) than an additional storage device based on a determination that the first node is likely to require greater fault tolerance than an second node. Or the first chunk may be composed of capacity slices having a total address space size that is equivalent to a capacity requirement of the first node.

The combining module 330 may distribute the plurality of capacity slices across each chunk of the plurality of capacity slices such that parity relationships are maintained between logical storage devices to which the chunks are mapped even in the event of a failure of one or more underlying storage devices. For example, for RAID configurations in which parity data is to be distributed across the logical storage devices (e.g., a RAID 5 or RAID 6 configuration), the combining module 330 may include in each chunk enough capacity slices from an underlying storage device that is dedicated to the logical device for storing parity data pertaining to the other logical devices. Or, for RAID configurations in which parity data is to be stored on one or more logical disks dedicated to parity (e.g., a RAID 3 or a RAID 4 configuration), the combining module 330 may include in each chunk that is mapped to a logical disk dedicated to storing parity data enough capacity slices corresponding to one or more underlying storage devices that are dedicated to the logical disk.

At operation 408, the mapping module 332 maps one or more chunks of the plurality of capacity slices to one or more logical storage devices. The mapping module 332 may determine the one or more logical storage devices based on requirements of nodes of the data storage system. For example, if a first node of the data storage system requires a RAID 5 configuration and a second node of the data storage system requires a RAID 6 configuration, the mapping module 332 may map four of the chunks of capacity slices to four logical storage devices that may be assigned to the first node, and map three of the chunks of capacity slices to three additional logical storage devices that may be assigned to the second node.

At operation 410, the organizing module 334 organizes groups of logical storage devices. For example, the organizing module 334 may organize a group of logical storages into a redundant array (e.g., a RAID configuration). The organizing module 334 may also organize an additional group of logical storage devices into an additional redundant array or organize a group of logical storage devices into spare logical devices (e.g., to support a RAID configuration). For RAID configurations in which parity data is to be distributed across the logical storage devices (e.g., a RAID 5 or RAID 6 configuration), the organizing module 334 may control the storing of parity data for each logical storage device such that the parity data is stored on capacity slices corresponding to one or more underlying storage devices that are dedicated to the logical storage device, thus ensuring that parity relationships between the logical storage devices are not lost in the event of a failure of one or more of the underlying storage devices. For RAID configurations in which one or more storage devices are to be dedicated to parity (e.g., a RAID 3 or a RAID 4 configuration), the organizing module 334 may control the storing of parity data on each of the logical parity storage devices such that the parity data is stored in capacity slices corresponding to one or more underlying storage devices that are dedicated to the logical disk.

Figure 5:
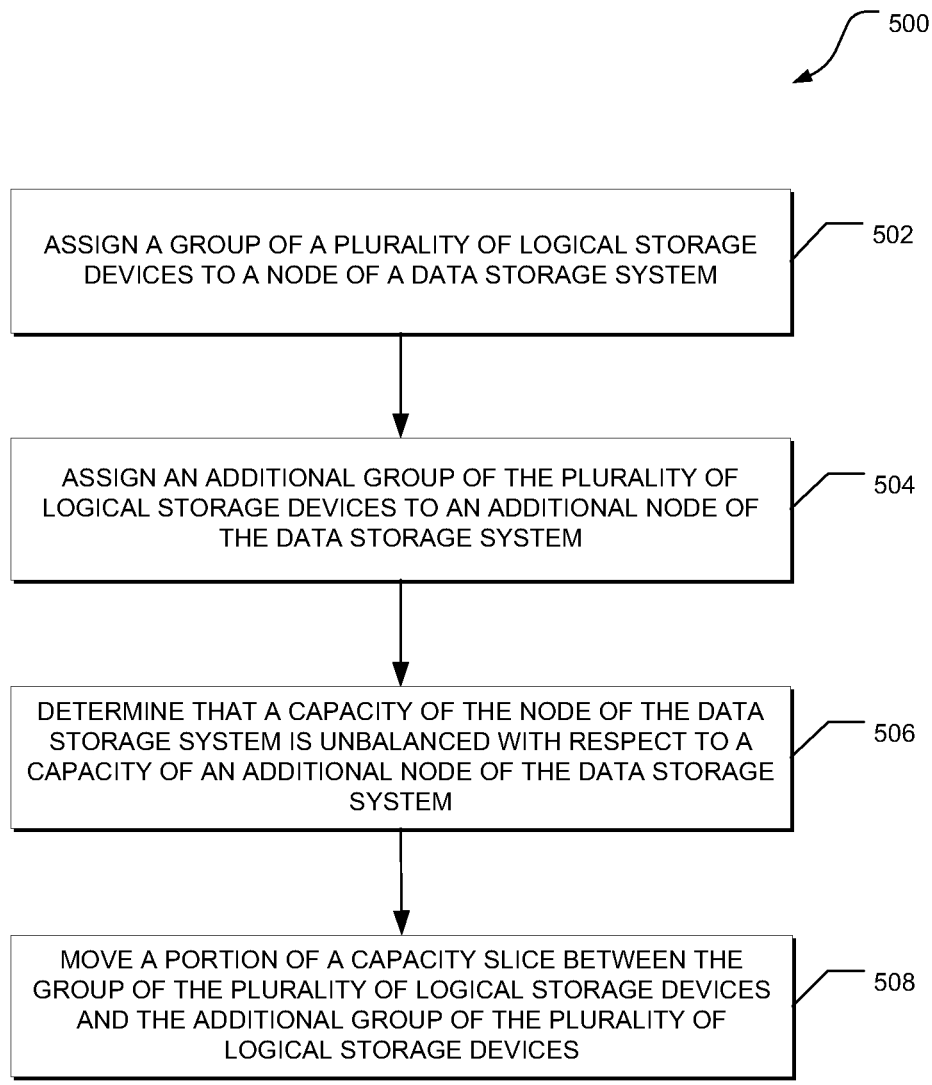
FIG. 5 depicts a flow diagram of a general overview of a method of maintaining a balance between nodes of a data storage system with regard to one or more storage characteristics of the nodes.

FIG. 5 depicts a flow diagram of a general overview of a method 500, in accordance with an embodiment, of maintaining a balance between nodes of a data storage system with regard to one or more storage characteristics of the nodes. The method 500 may be executed by, for example, the management module 322 of FIG. 3. The assigning module 338 assigns one or more groups of a plurality of logical storage devices to one or more sub-systems (e.g., nodes) of the data storage system. For example, the assigning module 338 assigns four or more logical storage devices to the node 104 such that the node 104 may support a RAID 6 configuration and three or more logical storage devices to the node 106 such that the node 106 may support a RAID 5 configuration. The nodes to which the groups of plurality of logical storage devices are assigned may not detect that the logical storage devices assigned to the nodes are comprised of capacity slices derived from one or more underlying storage devices. Additionally, the nodes may not detect that the logical storage devices are not physical storage devices. Alternatively, the nodes may be configured to treat the logical storage devices as if they are physical storage devices.

At operation 504, the balancing module 340 balances storage characteristics across multiple nodes of the data storage system. For example, the balancing module 322 may detect that a storage capacity, performance, or fault tolerance of a node is unbalanced with respect to an additional node. Based on this determination, the balancing module 340 may move one or more portions (e.g., one or more address spaces) of a capacity slice between the nodes to move toward restoring a balance between the nodes. For example, if the IOPS of the node 104 become unbalanced with respect to the IOPS of the node 108, the balancing module 340 may move a capacity slice between the node 104 and the node 108 of FIG. 1. The balancing module 322 may select the capacity slice for moving based on a determination that the capacity slice corresponds to a storage device (e.g., a solid state drive) having better performance than an additional storage device (e.g., a hard disk drive), which is thus better suited to address the imbalance of IOPS between the node 104 and the node 106 than a capacity slice corresponding to the additional storage device.

Figure 6:
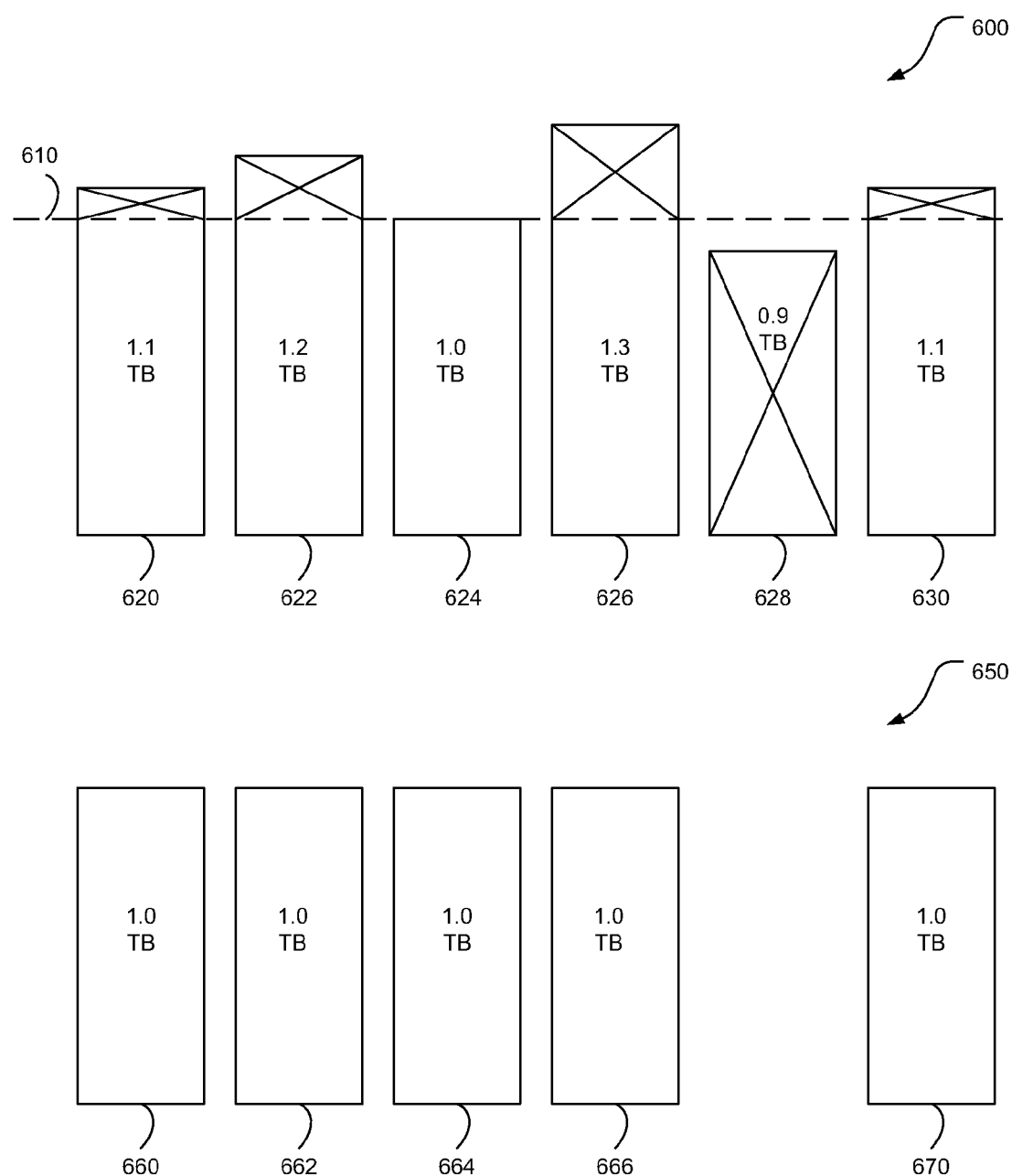
FIG. 6 is a block diagram depicting an example of a result of a method of organizing a plurality of data storage devices into a redundant array of data storage devices.

FIG. 6 is a block diagram depicting an example of a result of a method of organizing a plurality of data storage devices 600 into a redundant array of data storage devices 650 having a minimum target capacity per data storage device 610 of 1 TB. As depicted, data storage device 620 has an actual storage capacity of 1.1 TB, data storage device 622 has an actual storage capacity of 1.2 TB, data storage device 624 has an actual storage capacity of 1.0 TB, data storage device 626 has an actual storage capacity of 1.3 TB, data storage device 628 has an actual storage capacity of 0.9 TB, and data storage device 630 has an actual storage capacity 1.1 TB. Because the plurality of storage devices 600 are organized into a redundant array 650 in which each of the plurality of storage devices 660-670 provides 1.0 TB of actual capacity to the storage system, some of the actual capacity of the storage devices 620-630 is lost. For example, the actual capacities of the storage devices 620 and 630 are 1.1 TB, so 0.1 TB of each of the storage devices is lost when the storage devices 620 and 630 are incorporated into the redundant array 650 as storage devices 660 and 670. Similarly, 0.2 TB of the actual capacity of storage device 622 is lost when the storage device 622 is incorporated into the redundant array 650 as storage device 662 and 0.3 TB of the actual capacity of storage device 626 is lost when the storage device 626 is incorporated into the redundant array 650 as storage device 666. Additionally, because storage device 628 has an actual capacity of less than the 1 TB that is required to incorporate device 628 into the redundant array 650, the entire actual capacity (0.9 TB) of device 628 is lost when the plurality of storage devices 660 are organized into the redundant array 650.

Figure 7:
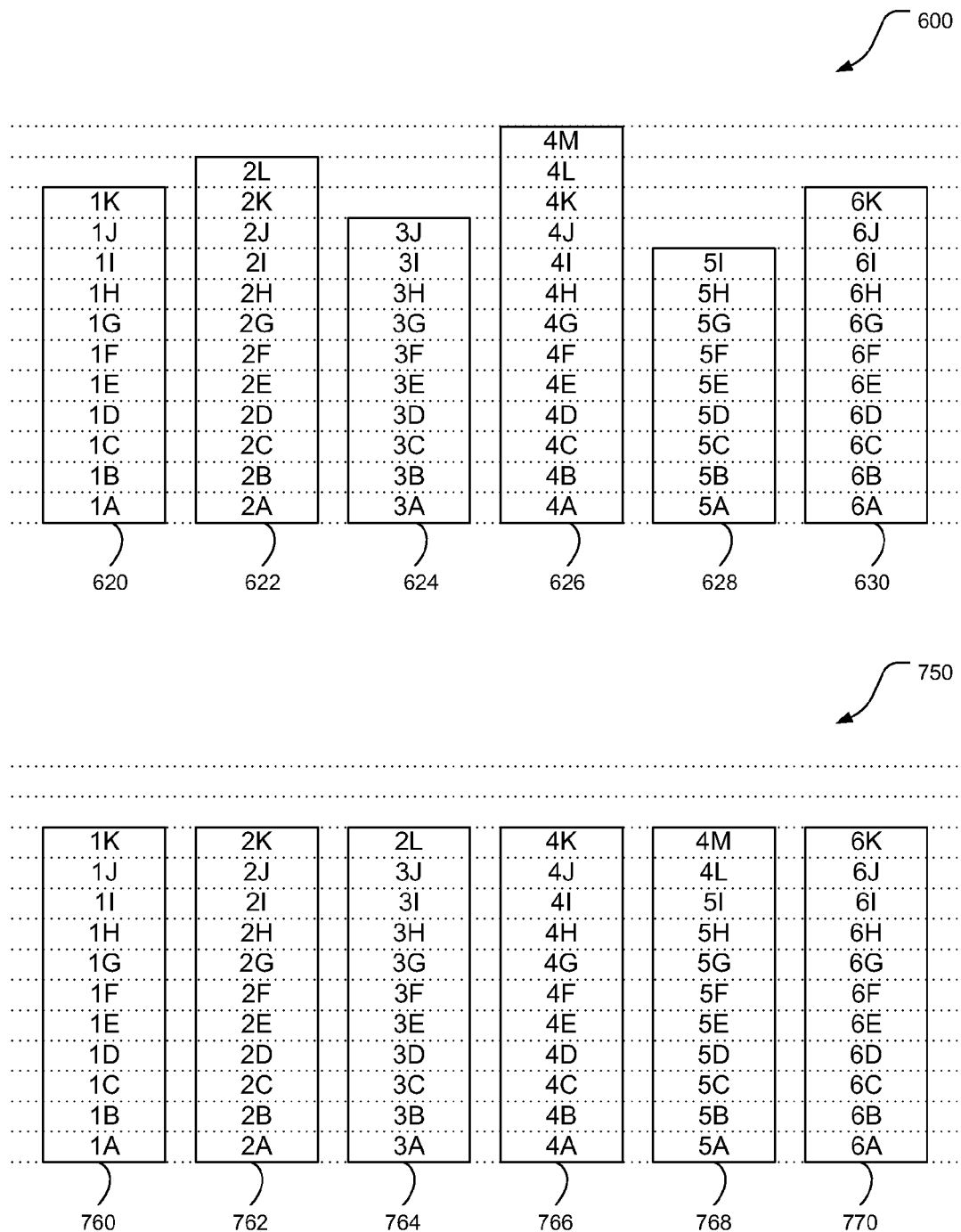
FIG. 7 is a block diagram depicting an example of a result of a method that includes dividing the actual capacities of the plurality of data storage devices into a plurality of capacity slices and combining the plurality of capacity slices into chunks of the plurality capacity slices.

FIG. 7 is a block diagram depicting an example of a result of the method 400 of FIG. 4, which includes dividing the actual capacities of the plurality of data storage devices 600 into a plurality of capacity slices and combining the plurality of capacity slices into chunks 750 of the plurality capacity slices. The dividing module 328 pools the address spaces of the identified actual capacities of the storage devices 600 and divides the pool into capacity slices of 0.1 TB each. Thus, the actual capacity of data storage device 620 is divided into 11 0.1 TB capacity slices 1A-1K, the actual capacity of data storage device 622 is divided into 12 0.1 TB capacity slices 2A-2L, the actual capacity of data storage device 624 is divided into 10 0.1 TB capacity slices 3A-3J, the actual capacity of data storage device 626 is divided into 13 0.1 TB capacity slices 4A-4M, the actual capacity of data storage device 628 is divided into 9 0.1 TB capacity slices 5A-5I, and the actual capacity of data storage device 630 is divided into 11 TB capacity slices 6A-6K.

The combining module 330 combines the plurality of capacity slices into chunks of the plurality capacity slices 750. In this embodiment, the combining module 330 composes the chunks 750 such that chunk 760 includes capacity slices 1A-1K, chunk 762 includes capacity slices 2A-2K, chunk 764 includes capacity slices 3A-3J and 2L, chunk 766 includes capacity slices 4A-4K, chunk 768 includes capacity slices 5A-5I and 4L-4M, and chunk 770 includes capacity slices 6A-6K. The mapping module 332 may map the chunks 750 to a plurality of logical storage devices. The organizing module 334 may organize the plurality of logical storage devices into a redundant array (e.g., a RAID 6 configuration).

Unlike the redundant array 650 of data storage devices, the redundant array of the plurality of logical storage devices that is derived from the chunks 750 includes all of the actual capacities of the underlying data storage devices 600. In particular, the actual capacity of data storage device 628 is used even though the actual capacity of data storage device 628 is below the minimum target capacity per data storage device 610. Additionally, the actual capacities of data storage devices 620, 620, 626, and 630 are used even though their actual capacities exceed the minimum target capacity per data storage device 610. Moreover, the redundant array of the plurality of logical storage devices derived from the chunks 750 includes six logical storage devices, which is one more device than the five data storage devices included in the redundant array 650. Thus, in certain redundant array configurations (e.g., a RAID 6 configuration, which has a space efficiency of 1-2/n, where n is the number of storage devices in the redundant array), the array of the plurality of logical storage devices may have more space efficiency than the redundant array 650 of data storage devices. Furthermore, the plurality of logical storage devices derived from the chunks 750 has a capacity per device (1.1 TB) that exceeds the minimum target capacity per data storage device 610 (1.0 TB). Thus, the plurality of logical storage devices derived from the chunks 750 may be organized into a redundant array that includes 6.6 TB of actual capacity, which is 32% more than the actual capacity (5.0 TB) of the redundant array 650.

Figure 8:
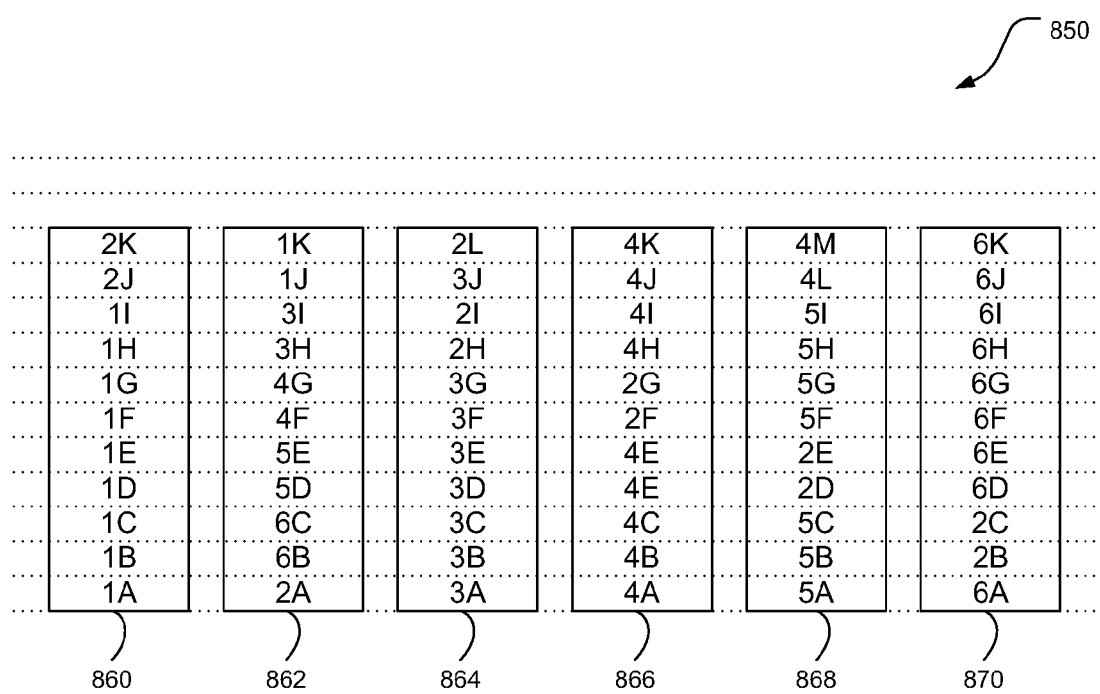
FIG. 8 is a block diagram depicting an example of a result of a method that includes distributing a plurality of capacity slices derived from a plurality of storage devices such that they are distributed across chunks of the plurality of capacity slices.

FIG. 8 is a block diagram depicting an example of a result of the method 400 in which the combining module 330 composes the chunks 850 such that the plurality of capacity slices corresponding to underlying storage devices 620 (e.g., a storage device having a better performance characteristic, such as IOPS, than the other underlying storage devices) are distributed across the chunks 850 of the plurality of capacity slices. In this example, the combining module 330 composes the chunks 850 such that chunk 860 includes capacity slices 1A-1I and 2J-2K, chunk 862 includes capacity slices 2A, 6B-6C, 5D-5E, 4F-4G, 3H-3I, and 1J-1K, chunk 864 includes capacity slices 3A-3G, 2H-2I, 3J, and 2L, chunk 866 includes capacity slices 4A-4E, 2F-2G, and 4H-4K, chunk 868 includes capacity slices 5A-5I, 2D-2E, and 4L-4M, and chunk 870 includes capacity slices 6A-6K. By distributing the capacity slices corresponding to storage device 620 across the chunks 750, the combining module 330 may not only increase the overall performance of the storage system 120 (e.g., if the underlying storage device 620 has a better performance characteristic than the other underlying storage devices), but also increase the fault tolerance of the storage system in the case of one or more failures of the underlying storage devices 600.

Figure 9:
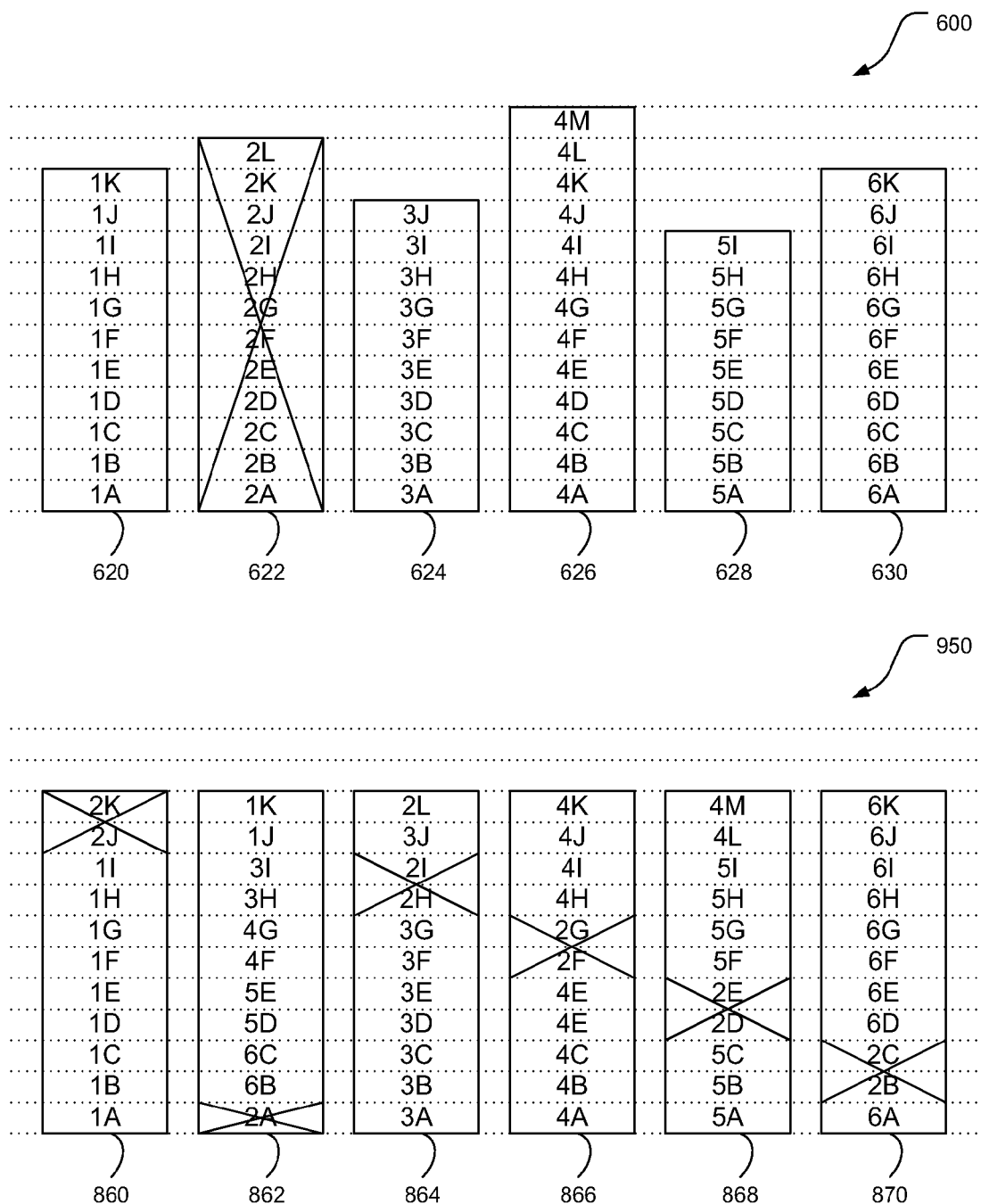
FIG. 9 is a block diagram depicting an example of how a failure of a data storage device affects a plurality of chunks of capacity slices that are mapped to logical storage devices.

FIG. 9 is a block diagram depicting how a failure of data storage device 622 of the plurality of data storage devices 600 affects the plurality of chunks 950 of capacity slices 860-870 that are mapped to logical storage devices. Here, the failure of the underlying data storage device 622 appears as a partial failure of each of the logical storage devices 860-870. The recovering module 342 may detect a partial failure of a logical storage device. Based on this detection of a partial failure, the recovering module 342 may restore the data on the logical device from parity data distributed across the other logical devices or parity data stored in logical disks dedicated to storing the parity data. For example, the recovering module 342 may restore the data onto capacity slices taken from a pool of spare capacity slices, such as the pool of spare capacity slices 1040 depicted in FIG. 10, and replace the capacity slices in each chunk corresponding to the failed underlying data storage device 622 with the spare capacity slices 1040.

Because multiple underlying storage devices may be associated with each of the logical storage devices that experience the partial failure and with each of the logical storage devices from which spare capacity is derived, the restoring module 342 may incorporate the multiple underlying storage devices to simultaneously assist in restoring any lost data to a new capacity slices or to assist in maintaining access to the data storage system 120 by client devices. In other words, the restoring module 342 may incorporate multiple underlying storage devices to reduce the amount of time needed to restore lost data or to reduce any performance loss occurs during the recovery in comparison to a typical RAID rebuild of a failed storage device in which all of the spindles must participate in the process (e.g., a RAID 5 rebuild) or in which a hot spare and one mirror must participate in the process (e.g., in a RAID 10 rebuild). In fact, the restoring module 342 may be configured (e.g., by an administrator of the storage system 102) to incorporate the multiple underlying storage devices to emphasize recovering the lost data quickly or minimizing any performance loss that occurs during the recovery of the lost data.

Figure 10:
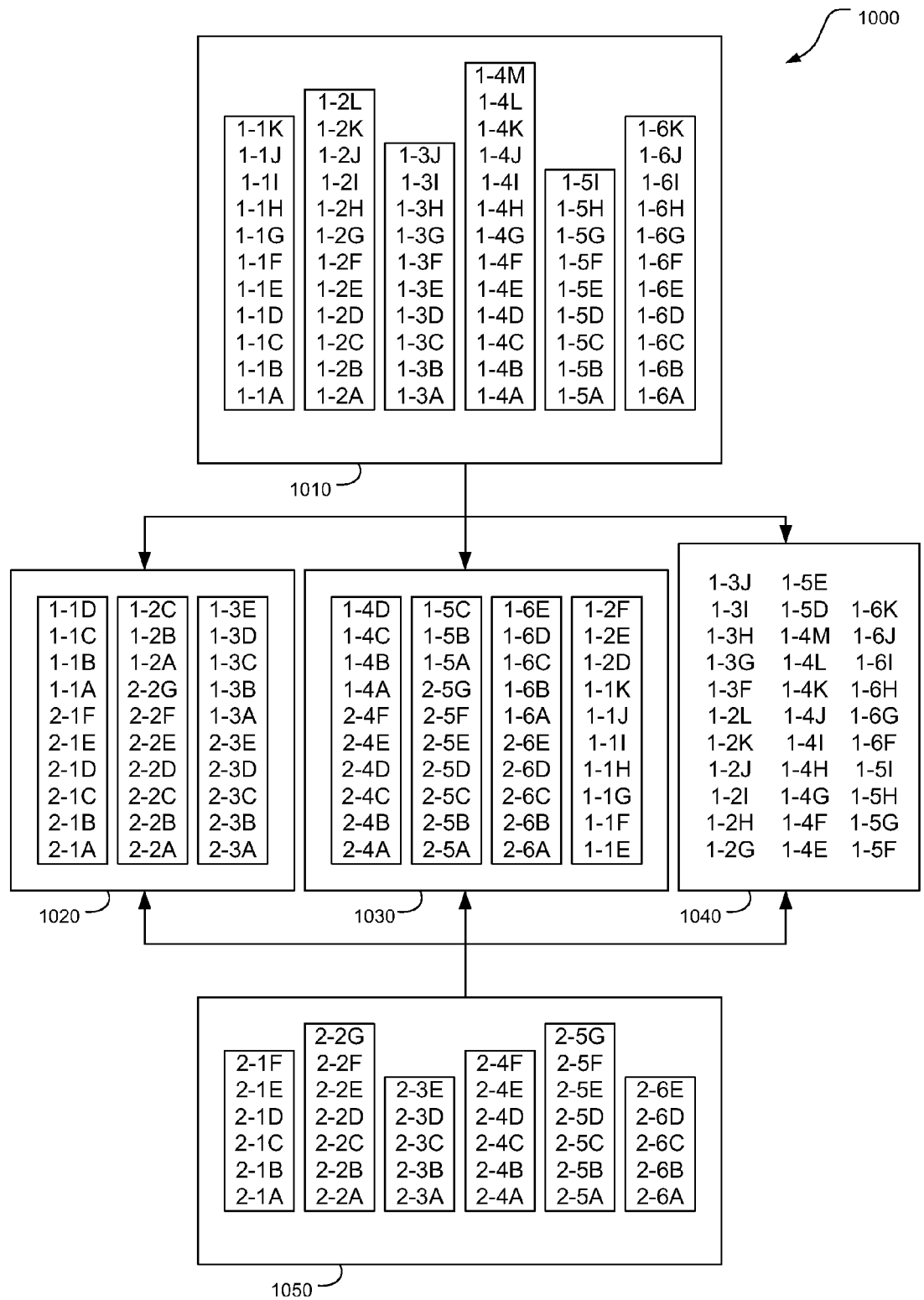
FIG. 10 is a block diagram depicting an example result of a method that includes organizing capacity slices derived from multiple storage devices into multiple redundant arrays and a pool of spare capacity slices.

FIG. 10 is a block diagram depicting an example result of the method 400 of FIG. 4 in which pluralities of storage devices 1010 and 1050 (e.g., corresponding to the node 104 and the node 108, respectively, of the data storage system 102) are arranged into redundant arrays 1020 and 1030 of logical storage devices and a pool of spare capacity slices 1040. The redundant array 1020 includes three logical storage devices, each of which is composed of capacity slices derived from the plurality of capacity slices 1010 and the plurality of capacity slices 1050. Each of the redundant arrays 1020 and 1040 may have a different redundancy level (e.g., the redundant array 1020 may be organized into a RAID 4 configuration and the redundant array 1040 may be organized into a RAID 5 configuration. The redundant array 1030 includes four logical storage devices, each of which is also composed of capacity slices derived from the plurality of capacity slices 1010 and the plurality of capacity slices 1050. Additionally, the pool of spare capacity slices 1040 includes capacity slices derived from the plurality of capacity slices 1010 and the plurality of capacity slices 1050. Each of the spare capacity slices 1040 may be incorporated into the redundant array 1020 or the redundant array 1030 based, for example, on a failure of one or more of the plurality of storage devices 1010 and 1050.

At run-time, the balancing module 340 may redistribute capacity slices between the redundant array 1020 and the redundant array 1030 to, for example, maintain a balance of storage characteristics between the node 104 and the node 108 of FIG. 1. Additionally, the recovering module 342 may use capacity slices from the pool of spare capacity slices 1040 to restore data lost from capacity slices in the logical storage devices in the redundant arrays 1020 and 1030 because of, for example, a failure of one or more underlying storage devices in the pluralities of storage devices 1010 and 1050.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). As used herein, "cloud computing" may be a network-based (e.g., Internet-based) computing system in which shared resources, software, or information are provided to sub-level computing systems when requested. A sub-level computing system may embody a general- or special-purpose computer, a server, network of computers, or another data storage system for instance. In cloud computing, details may be abstracted from the sub-level computing system such that the sub-level computing system need not exercise control over infrastructure of the cloud. For example, cloud computing may take the form of a sub-level computing system accessing a remote, web-based application executing on a cloud from a web browser on the sub-level computing system computer and processing data using the web-based application as if it was executing within the sub-level computing system.

At least some of the operations described herein may be performed by a group of computers (as examples of machines including processors) on a cloud. These operations may be accessible via a network (e.g., the network 122) and via one or more appropriate interfaces (e.g., APIs). For example, the modules of the management module 322 may be configured to execute on a cloud (e.g., to retrieve policies or information about backup files from a storage system of the cloud computing system). As another example, the node 104 or at least one of the central processing unit 202, the non-volatile memory device 204, the volatile memory device 206, or the mass storage device 106 may be derived from shared resources of the cloud.

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Below are set out hardware (e.g., machine) and software architectures that may be deployed, in various example embodiments.

Figure 11:
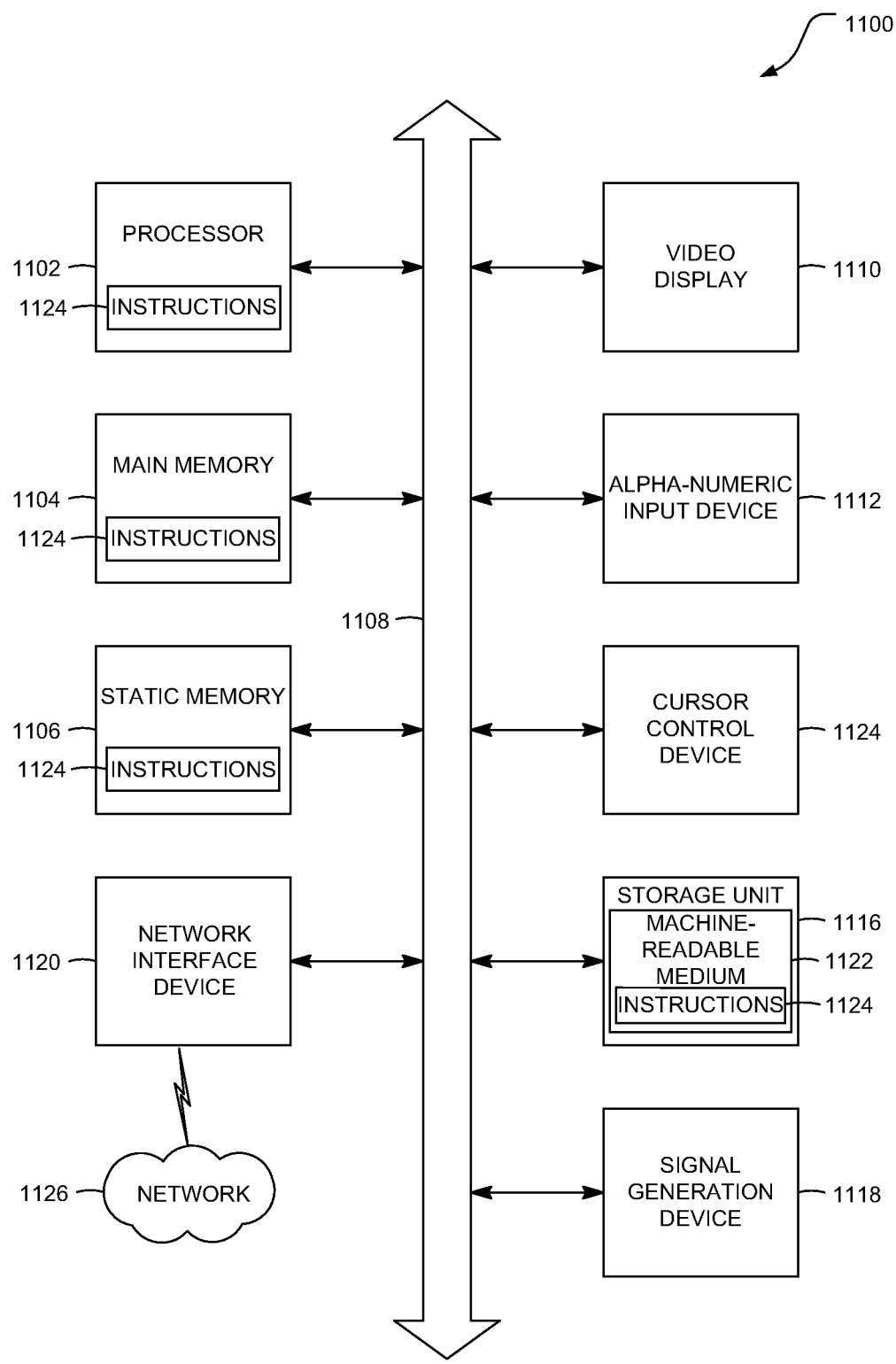
FIG. 11 is a block diagram of machine in the example form of a computer system within which instructions for causing the machine to perform any one or more of the methodologies discussed herein may be executed.

FIG. 11 is a block diagram of machine in the example form of a computer system 1100 or data storage system within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation (or cursor control) device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media. The instructions 1124 may also reside, completely or at least partially, within the static memory 1106. The central processing unit 202 may be an example of the processor 1102.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 122 of FIG. 1 is an example of the network 1126.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of configuring a data storage system, the method comprising:
   determining an actual capacity of a plurality of physical storage devices, the plurality of physical storage devices having at least a set of different storage characteristics;
   pooling address spaces of the plurality of physical storage devices;
   dividing the pool of address spaces into a plurality of capacity slices based on the determined actual capacities of each of the plurality of physical storage devices;
   determining one or more storage requirements for a node in the data storage system;
   combining, using a processor, at least some of the plurality of capacity slices into one or more chunks based at least in part on the one or more storage requirements, the one or more chunks composed of capacity slices having storage characteristics of the respective physical storage devices from which the at least some of the capacity slices are derived; and
   assigning the one or more chunks to the node in the data storage system.

2. The method of claim 1, further comprising:
   mapping the one or more chunks to a plurality of logical storage devices; and
   organizing a group of the plurality of logical storage devices into a redundant array of logical storage devices.

3. The method of claim 1, wherein the one or more storage requirements are determined relative to other nodes in the data storage system.

4. The method of claim 1, wherein the one or more storage requirements are determined to meet requirements of one or more applications executed on the node.

5. The method of claim 1, wherein the one or more storage requirements include one or more of a capacity requirement, a performance requirement, an input/output operations per second requirement, and a fault tolerance requirement.

6. The method of claim 1, further comprising:
   determining a change in the storage requirements for the node; and
   combining and assigning a new set of chunks to the node based on the change in the storage requirements.

7. The method of claim 1, wherein each of the one or more chunks has a same size.

8. A data storage system comprising:
   a memory resource to store instructions; and
   one or more processors using the instructions stored in the memory resource to:
      pool address spaces of a plurality of physical storage devices of the data storage system, the plurality of physical storage devices having at least a set of different storage characteristics;
      determine an actual capacity of each of the plurality of physical storage devices;
      divide the pool of address spaces into a plurality of capacity slices based on the determined actual capacities of each of the plurality of physical storage devices;
      determine one or more storage requirements for a node in the data storage system;
      combine at least some of the plurality of capacity slices into one or more chunks based at least in part on the one or more storage requirements, the one or more chunks composed of capacity slices having storage characteristics of the respective physical storage devices from which the at least some of the capacity slices are derived; and
      assign the one or more chunks to the node in the data storage system.

9. The data storage system of claim 8, further comprising instructions used by the one or more processors to:
   map the one or more chunks to a plurality of logical storage devices; and
   organize a group of the plurality of logical storage devices into a redundant array of logical storage devices.

10. The data storage system of claim 8, wherein the one or more storage requirements are determined relative to other nodes in the data storage system.

11. The data storage system of claim 8, wherein the one or more storage requirements are determined to meet requirements of one or more applications executed on the node.

12. The data storage system of claim 8, wherein the one or more storage requirements include one or more of a capacity requirement, a performance requirement, an input/output operations per second requirement, and a fault tolerance requirement.

13. The data storage system of claim 8, further comprising instructions used by the one or more processors to:
   determine a change in the storage requirements for the node; and
   combine and assigning a new set of chunks to the node based on the change in the storage requirements.

14. The data storage system of claim 8, wherein each of the one or more chunks has a same size.

15. A non-transitory computer-readable medium that stores instructions, executable by one or more processors, to cause the one or more processors to perform operations that comprise:
   pooling address spaces of a plurality of physical storage devices of a data storage system, the plurality of physical storage devices having at least a set of different storage characteristics;
   determining an actual capacity of each of the plurality of physical storage devices;
   dividing the pool of address spaces into a plurality of capacity slices;
   determining one or more storage requirements for a node in the data storage system based on the determined actual capacities of each of the plurality of physical storage devices;
   combining at least some of the plurality of capacity slices into one or more chunks based at least in part on the one or more storage requirements, the one or more chunks composed of capacity slices having storage characteristics of the respective physical storage devices from which the at least some of the capacity slices are derived; and
   assigning the one or more chunks to the node in the data storage system.

16. The non-transitory computer-readable medium of claim 15, further comprising instructions to cause the one or more processors to perform operations that comprise:
 mapping the one or more chunks to a plurality of logical storage devices; and
 organizing a group of the plurality of logical storage devices into a redundant array of logical storage devices.

17. The non-transitory computer-readable medium of claim 15, wherein the one or more storage requirements are determined relative to other nodes in the data storage system.

18. The non-transitory computer-readable medium of claim 15, wherein the one or more storage requirements are determined to meet requirements of one or more applications executed on the node.

19. The non-transitory computer-readable medium of claim 15, wherein the one or more storage requirements include one or more of a capacity requirement, a performance requirement, an input/output operations per second requirement, and a fault tolerance requirement.

20. The non-transitory computer-readable medium of claim 15, further comprising instructions to cause the one or more processors to perform operations that comprise:
 determining a change in the storage requirements for the node; and
 combining and assigning a new set of chunks to the node based on the change in the storage requirements.

\* \* \* \* \*